United States Patent
Cho et al.

(10) Patent No.: US 8,811,202 B2
(45) Date of Patent: Aug. 19, 2014

(54) SAFETY MONITORING PHOTO SERVICE PROVISION METHOD AND SYSTEM

(75) Inventors: Yongrae Cho, Seoul (KR); Eunjung Song, Seoul (KR); Junghwa Yoo, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 211 days.

(21) Appl. No.: 13/002,150

(22) PCT Filed: Jun. 30, 2009

(86) PCT No.: PCT/KR2009/003532
§ 371 (c)(1),
(2), (4) Date: Feb. 18, 2011

(87) PCT Pub. No.: WO2010/002168
PCT Pub. Date: Jan. 7, 2010

(65) Prior Publication Data
US 2011/0134805 A1    Jun. 9, 2011

(30) Foreign Application Priority Data
Jul. 1, 2008    (KR) .................. 10-2008-0063472

(51) Int. Cl.
*H04L 12/28*    (2006.01)
*H04J 1/16*    (2006.01)

(52) U.S. Cl.
USPC ............ 370/252; 370/278; 370/329; 370/386

(58) Field of Classification Search
USPC .................................. 370/252, 329, 278, 386
See application file for complete search history.

(56) References Cited

U.S. PATENT DOCUMENTS

| | | | |
|---|---|---|---|
| 5,818,733 A | 10/1998 | Hyuga | |
| 7,321,862 B2 * | 1/2008 | Rosenfeld et al. | ............... 705/3 |
| 2005/0068169 A1 | 3/2005 | Copley et al. | |
| 2007/0023496 A1 | 2/2007 | Hall | |
| 2007/0087756 A1 * | 4/2007 | Hoffberg | ..................... 455/450 |
| 2007/0139182 A1 | 6/2007 | O'Connor et al. | |

FOREIGN PATENT DOCUMENTS

| | | |
|---|---|---|
| GB | 2 428 542 | 1/2007 |
| GB | 2 435 535 | 8/2007 |
| KR | 10-0379946 | 4/2003 |
| KR | 10-0595894 | 6/2006 |
| WO | WO2005/040847 | 5/2005 |
| WO | WO2006/064265 | 6/2006 |
| WO | WO2007/081629 | 7/2007 |

OTHER PUBLICATIONS

Supplementary Search Report, European Application No. 09773704.3, mailed Nov. 21, 2011.

* cited by examiner

*Primary Examiner* — John Pezzlo
(74) *Attorney, Agent, or Firm* — Fox Rothschild LLP

(57) ABSTRACT

A safety photo service providing method and system are disclosed. The safety photo service providing method comprises setting a time for identifying a location of a ward, changing location identification networks for the ward depending on whether the ward is located in a predetermined area, performing location identification and image capturing by a ward's terminal at the set time, and transmitting location identification information including at least one a location of the ward and a captured image to the guardian's terminal.

22 Claims, 4 Drawing Sheets

SAFETY MONITORING PHOTO SERVICE PROVISION METHOD AND SYSTEM

CROSS-REFERENCE TO RELATED APPLICATIONS

This application is the National Stage of International Application No. PCT/KR2009/003532, filed on Jun. 30, 2009, which claims the benefit of Korean Application Serial No. 10-2008-0063472, filed on Jul. 1, 2008. The contents of both of the foregoing applications are hereby incorporated by reference in their entirety.

TECHNICAL FIELD

The present invention relates to a safety photo service providing method and system, and particularly to a safety photo service providing method and system that transmits a location of a ward and a picture of surroundings of the ward to a guardian using a communication terminal of the ward at a predetermined time.

BACKGROUND ART

A guardian having a ward that lacks perceptive ability, such as parents having a child or a guardian of a handicapped person or dotard desires to regularly identify the location or activity of the ward. In cases where the ward is in danger, the guardian needs to identify the location of the ward more precisely and swiftly.

Accordingly, there is a need for a location identification method and system that may identify more correct location of the ward through various types of information and may immediately notify the dangerous situation of the ward.

DISCLOSURE

Technical Problem

The present invention provides a safety photo service providing method and system that may capture a picture of surroundings at a ward's current location using a communication terminal carried by the ward when a predetermined time arrives and may transmit the captured picture to a guardian, thus providing more correct location of the ward.

The present invention provides a safety photo service providing method and system that may automatically change location identification networks depending on a ward's location and thus allows for more correct location identification through a near-field communication network.

The present invention provides a safety photo service providing method and system that may transmit an alarm message to a guardian immediately when a ward is off a safety zone at a time set by the guardian so that the guardian may monitor more easily whether the ward is in danger.

Technical Solution

A safety photo service providing method according to an embodiment of the present invention comprises setting a time for identifying a location of a ward, changing location identification networks for the ward depending on whether the ward is located in a predetermined area, performing location identification and image capturing by a ward's terminal at the set time, and transmitting location identification information including at least one a location of the ward and a captured image to the ward's terminal.

A safety photo service providing system according to an embodiment of the present invention comprises an identification time setup unit setting a time for identifying a location of a ward, an identification network changing control unit changing location identification networks for the ward depending on whether the ward is located in a predetermined area, a location identification unit performing location identification and image capturing by a ward's terminal at the set time, and an identification information transmitting unit transmitting location identification information including at least one a location of the ward and a captured image to the ward's terminal.

ADVANTAGEOUS EFFECTS

According to an embodiment of the present invention, there is provided a safety photo service providing method and system that may capture an image of surroundings at a ward's current location using a communication terminal carried by the ward when a predetermined time arrives and may transmit the captured image to a guardian, thus providing more correct location of the ward.

According to an embodiment of the present invention, there is provided a safety photo service providing method and system that may automatically change location identification networks depending on a ward's location and thus allows for more correct location identification through a near-field communication network.

According to an embodiment of the present invention, there is provided a safety photo service providing method and system that may transmit an alarm message to a guardian immediately when a ward is off a safety zone at a time set by the guardian so that the guardian may monitor more easily whether the ward is in danger.

BEST MODE

Figure 1:
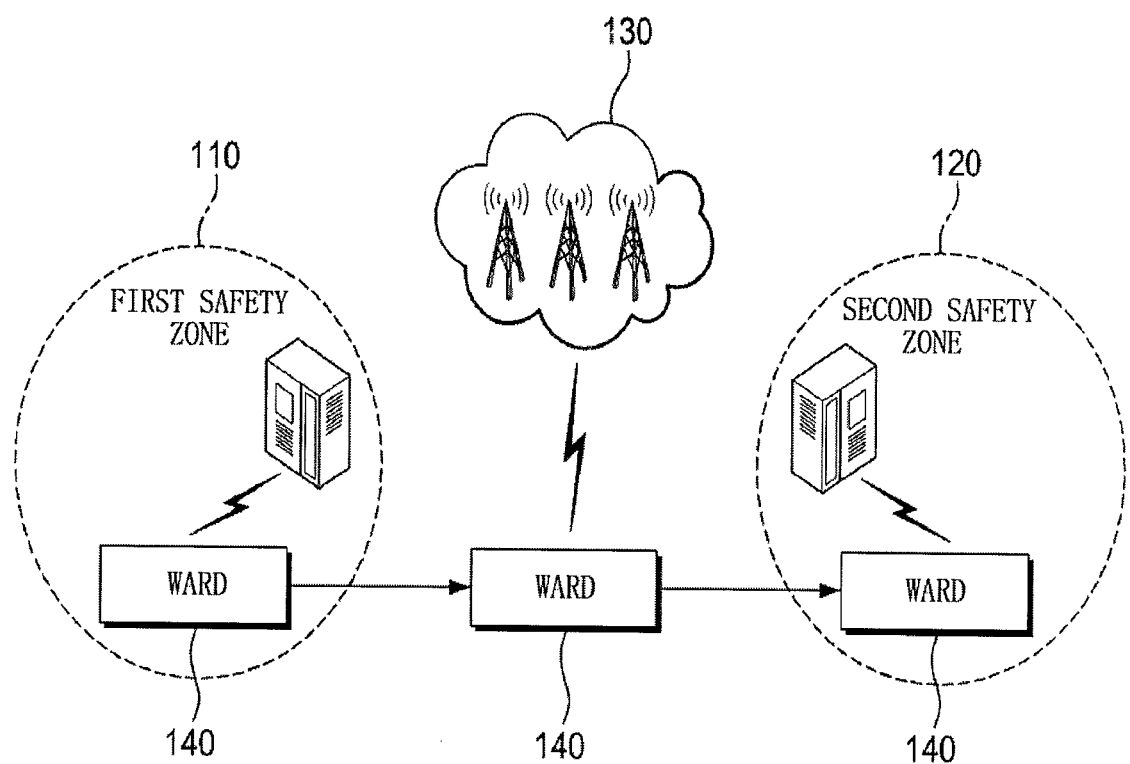
FIG. 1 is a view illustrating that location identification networks are changed depending on a ward's location according to an embodiment of the present invention.

Hereinafter, embodiments of the present invention will be described in detail with reference to the accompanying drawings. However, the present invention is not limited to the embodiments. Like reference characters refer to the same elements throughout the specification and the drawings.

FIG. 1 is a view illustrating that location identification networks are changed depending on a ward's location according to an embodiment of the present invention.

A guardian, such as a parent of a young child, a guardian of a disabled person, or a guardian of an elderly person, may let his/her ward lacking perceptive ability, such as the young child, the disabled person, or the elderly person, carry a communication terminal to protect the ward. By doing so, the guardian may identify information on the location of the ward through the communication terminal. The location of the ward may be identified more precisely by a picture of surroundings of the ward transmitted to the guardian together with a location coordinate or an address of the ward. The communication terminal may be configured in a form of a pendant that may be hung around the ward's neck so that the location identification and picture capturing may be performed without a separate action by the ward freely at any time. That is, the ward may keep the terminal around his neck all the time without the need of putting the terminal in his sack or bag so that picture capturing for his surroundings may be easily performed.

The ward may be located in or outside of a safety zone set by the guardian. Here, the "safety zone" refers to a region that may be set by the guardian at his discretion considering an activity area of the ward. For example, in cases where the ward is a young child, the guardian, his parents, may set private educational academies, schools, libraries, or one or more place as the safety zone. At this time, besides the schools and the academies, areas between the academies and the schools may also be set as the safety zone.

Referring to FIG. 1, in a case where the guardian sets two safety zones, such as a first safety zone 110 and a second safety zone 120, a near-field communication network may be installed in each of the first safety zone 110 and the second safety zone 120. When the ward 140 is located in an area where the near-field communication network is installed, the guardian may identify the location of the ward 140 through the near-field communication network. When the ward 140 is located outside of the area where the near-field communication network is installed, the guardian may identify the location of the ward 140 through a CDMA network 130. When the ward 140 moves from his current location to another location, location identification networks may be automatically changed. For example, when the ward 140 is located in the first safety zone 110, the location of the ward 140 is identified by the near-field communication network. When the ward 140 is off the first safety zone 110 and located in neither the first safety zone 110 nor the second safety zone 120, the near-field communication network is not available. In this case, the location identification networks are changed so that the location of the ward 140 may be identified through the CDMA network 130. The change of the location identification networks may be performed by the following method: First, a platform of the near-field communication network attempts to perform near-field location measurement. If the near-field location measurement is impossible, a location based service platform (LBSP) of a CDMA network or a WCDMA network performs location measurement. Accordingly, in cases where the ward is located in an area where near-field communication is available or not, the location identification networks may be automatically changed using the near-field communication network or CDMA/WCDMA network according to a corresponding location.

Figure 2:
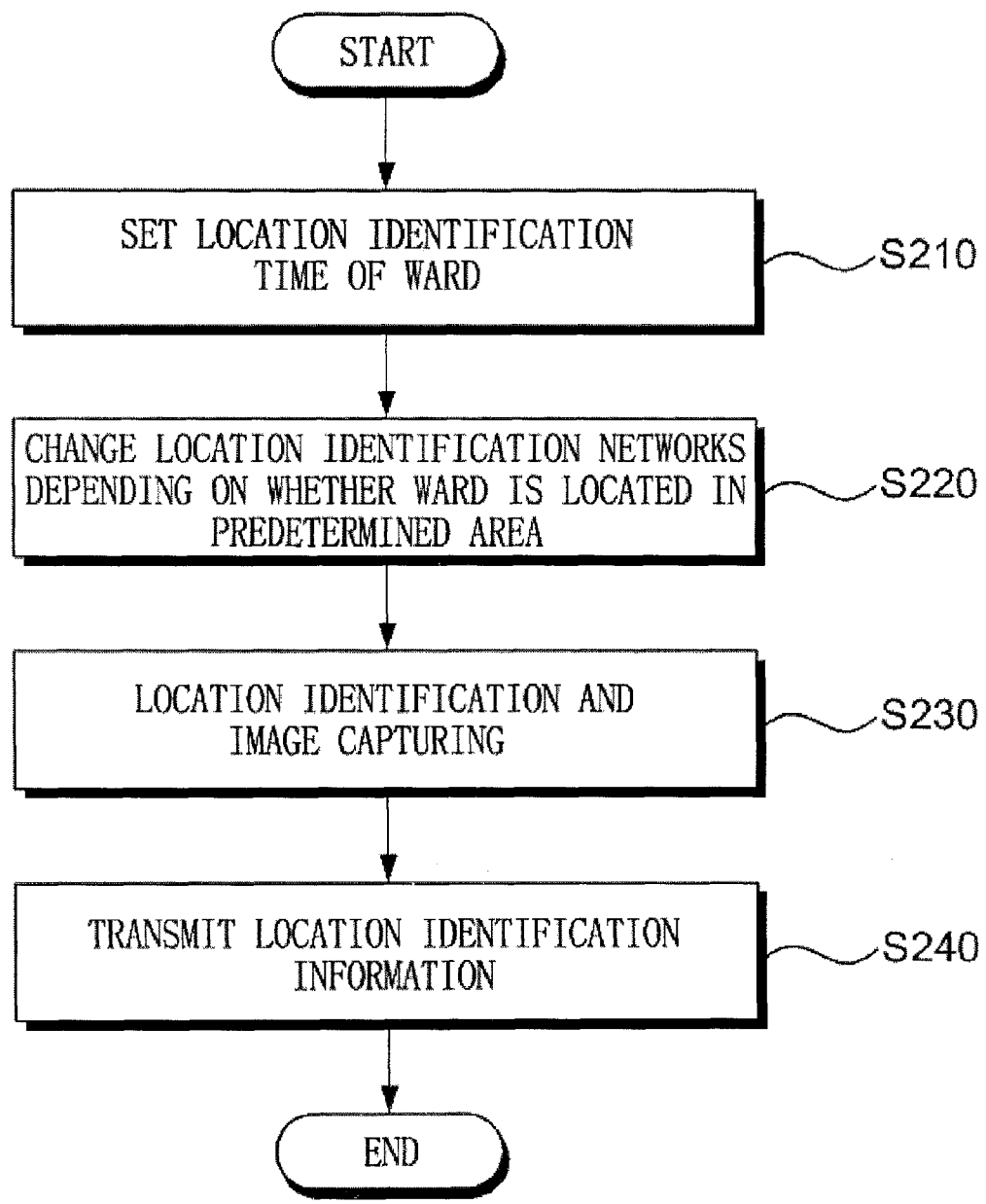
FIG. 2 is a flowchart illustrating a safety photo service providing method according to an embodiment of the present invention.

FIG. 2 is a flowchart illustrating a safety photo service providing method according to an embodiment of the present invention.

Referring to FIG. 2, a time for identifying the location of the ward is set in step S210. The time for identifying the location of the ward may be set so that the location of the ward is identified in a predetermined period or whenever one or more specified time arrives. For example, the guardian may set the time so that the location of the ward is identified every one hour or every two hours, or so that the location of the ward is identified when a specific time, such as 10 AM, 3 PM, or 5 PM, arrives.

In step S220, the location identification networks are changed depending on whether the ward is located in a predetermined area. The "predetermined area" may refer to an area where the near-field communication network is installed among areas where the ward travels. For example, in cases where the guardian sets a school, a private academy, and a travelling area between the school and the private academy as a safety zone, a near-field communication network may be installed in the school and the private academy, and an area in the school or an area in the private academy may be set as the "predetermined area". That is, when the ward moves from an area where the near-field communication network to the outside or vice versa, the location identification networks may be changed from the near-field communication network to the CDMA network/WCDMA network or vice versa. As an example of changing the location identification networks, the platform of the near-field communication network first attempts to perform near-field location measurement and, if the near-field location measurement is impossible, location measurement is performed by the LBSP of the CDMA network or WCDMA network so that the location identification networks are automatically changed simultaneously while the location of the ward is off the predetermined area. The process of changing the location identification networks will be described below in greater detail with reference to FIG. 3.

In step S230, location identification for the ward and picture capturing of surroundings of the ward are performed at times predetermined by the guardian and location identification information including the location of the ward and the picture of the surroundings is generated. The location identification and picture capturing may be automatically performed by a camera included in the terminal at the predetermined times. The location of the ward may be identified more precisely through the captured picture.

In step S240, the location identification information may be transmitted to the guardian. When the ward is located in the safety zone, location identification information including at least one of the captured picture and information on whether the ward is located in the safety zone may be transmitted to a guardian's terminal. When the ward is located outside of the safety zone, location identification information including at least one of a location where the ward is expected to be located at a predetermined time, a current location of the ward, and the capture picture may be transmitted to the guardian's terminal.

Figure 3:
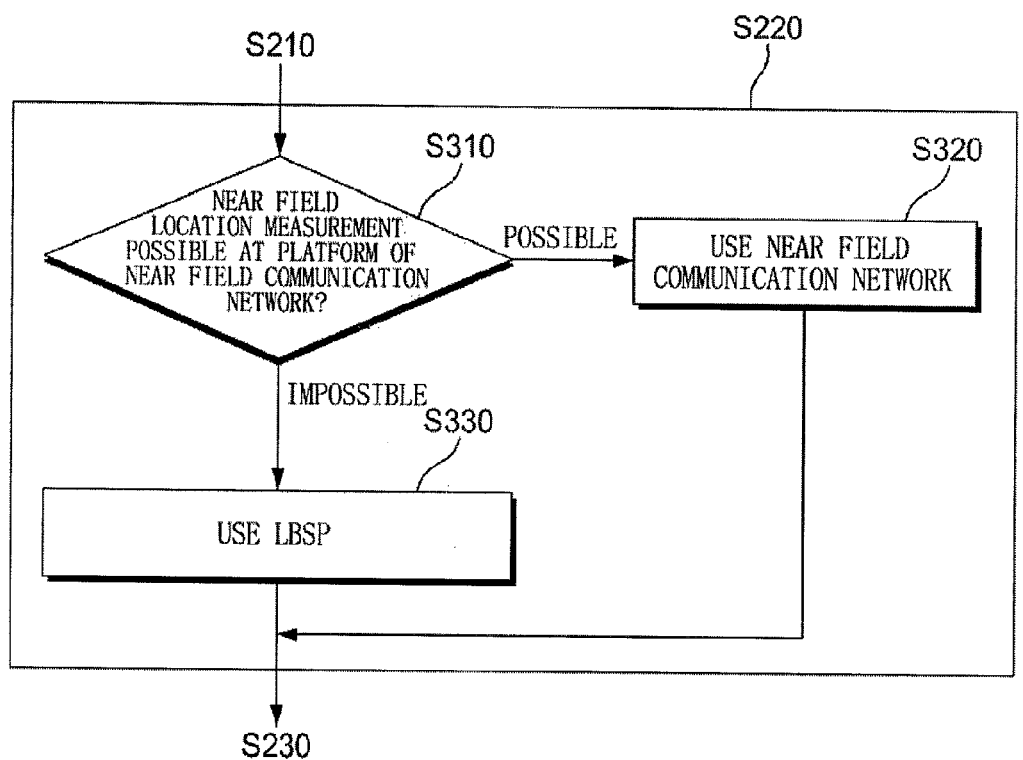
FIG. 3 is a view illustrating a method of changing location identification networks depending on whether a ward is located in a safety zone according to an embodiment of the present invention.

FIG. 3 is a view illustrating a method of changing location identification networks depending on whether a ward is located in a safety zone according to an embodiment of the present invention.

Referring to FIG. 3, in step S310, the platform of the near-field communication network periodically attempts to perform near-field location measurement. When the ward is located in the near-field communication network, location measurement may be performed by the near-field communication network. As such, the near-field location measurement is first attempted for more precise location measurement.

In step S320, in a case where near-field location measurement may be performed by the near-field communication network, the near-field communication network may be used. As an example, in a case where the ward moves from the outside of a predetermined area where the near-field communication network is available into the predetermined area, the near-field location measurement is impossible in the outside of the predetermined area but possible in the predetermined area. In this case, the location identification network may be automatically changed to the near-field communication network, and as a result, the near-field location measurement may be performed. As such, the location identification network may be automatically changed from the CDMA or WCDMA network to the near-distance communication network at the same time while the ward moves into the predetermined area.

In step S330, when the near-field location measurement by the near-field communication network is impossible, the location measurement is possible by the LBSP of the CDMA network or WCDMA network. For example, in a case where the ward moves from the predetermined area to the outside thereof, the near-field location measurement is possible in the predetermined area by the near-field communication network, but impossible in the outside of the predetermined. Thus, location measurement by the LBSP of the CDMA network or WCDMA network is secondly performed in the outside of the predetermined area. Accordingly, even if the ward moves from the predetermined area to the outside thereof, the location identification networks may be automatically changed.

That is, the location of the ward may be more precisely identified by automatically changing the location identification networks and by performing location measurement using the near-field communication network in the near-field area.

Figure 4:
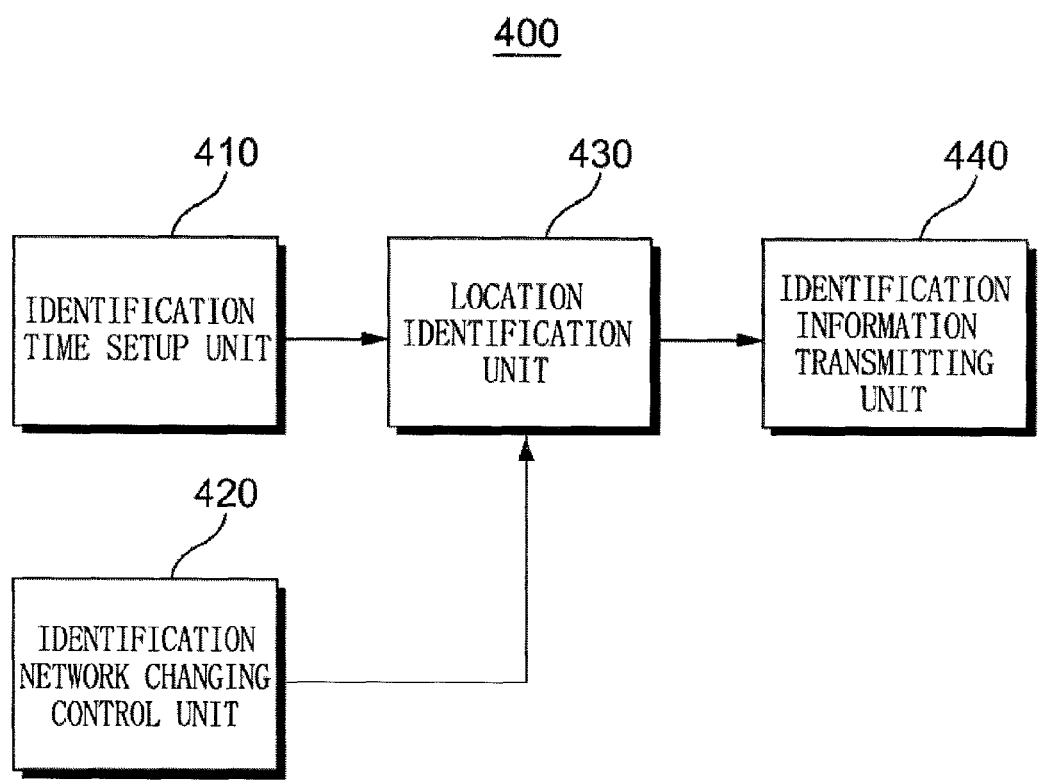
FIG. 4 is a view illustrating a safety photo service providing system according to an embodiment of the present invention.

FIG. 4 is a view illustrating a safety photo service providing system according to an embodiment of the present invention.

Referring to FIG. 4, a safety photo service providing system 400 includes an identification time setup unit 410, an identification network changing control unit 420, a location identification unit 430, and an identification information transmitting unit 440.

The identification time setup unit 410 sets up a location identification time of the ward. The location identification time may be set up by the guardian at his discretion. The location identification time may be set so that location identification is performed at a predetermined period or whenever one or more specified time arrives. For example, the guardian may set up the location identification time considering when the ward is highly likely to be in a dangerous area.

The identification network changing control unit 420 changes the location identification networks so that the near-field communication network is used when the ward is located in the predetermined area and the CDMA network or WCDMA network is used when the ward is located outside of the predetermined area. The platform of the near-field communication network attempts near-field location measurement. If the near-field location measurement is impossible, the location identification networks are automatically changed so that the location measurement is performed by the LBSP of the CDMA network or WCDMA network. Since the near-field location measurement is possible by the near-field communication network, the location of the ward may be more precisely measured, thus providing more precise location of the ward.

The location identification unit 430 enables the terminal of the ward to perform location identification and picture capturing at the predetermined time. Specifically, the location of the ward may be automatically identified at the predetermined time and the surroundings of the ward may be automatically captured by the camera included in the terminal at the predetermined time, and location identification information including at least one of the location of the ward and the captured picture may be generated. The ward's terminal may be a terminal that may perform communication, and may be configured in a form of a pendant that may be hung around the ward's neck.

Accordingly, even without manipulation of the ward lacking perceptive ability, the pendant-type terminal may automatically capture a picture at the predetermined time and may send the captured picture to the guardian together with the location identification result. The location identification information may include a distance between the ward and the guardian, a path reaching the ward, or a moving radius of the ward as well as the location of the ward and the captured picture.

The identification information transmitting unit 440 transmits the location identification information including at least one of the location of the ward and the captured picture. The location identification result and the captured picture may be transmitted by SMS. In this case, the guardian may identify the location of the ward, the picture, or a map in greater detail through a call-back connection. Further, the guardian may provide the ward with a moving path, a distance between the guardian and the ward, or a safety zone setup menu through the call-back connection. Further, the selected picture or picture may be magnified and provided.

In transmitting the location identification information, when the ward is located in the safety zone, location identification information including at least one of information on whether the ward is located in the safety zone and the captured picture may be transmitted to the guardian's terminal, and when the ward is located outside of the safety zone, location identification information including at least one of an expected location of the ward, a current location of the ward, and the captured picture may be transmitted to the guardian's terminal.

Further, in a case where the ward was expected to be located in the safety zone at the predetermined time, but the ward is located outside of the safety zone at the predetermined time, an alarm message may be transmitted to the guardian's terminal. Specifically, when the expected location of the ward (for example, safety zone) is different from the current location of the ward, the alarm message may be transmitted to the guardian's terminal. In this case, the alarm message may have various forms for alarming.

For example, when the expected location of the ward is the safety zone at the predetermined time but the location identification results shows that when the current location of the ward is off the safety zone, the alarm message may be immediately provided to the guardian.

At this time, even if the ward is located outside of the safety zone during a predetermined travel time (in a case where a travel region does not belong to the safety zone), the alarm may not be provided to the guardian. However, in a case where a young kid travels by subway or bus in a predetermined pattern even though the travel time is preset, the guardian may set expected locations of the ward (for example, a region from Sadang station of green line to Bangbae station) where the ward is expected to be located to the safety zone. If the location of the ward is off the set safety zone during the travel time, an alarm may be forwarded to the guardian.

In a case where the ward mostly stays in the safety zone except for going out with the guardian, an alarm message may be transferred to the guardian as soon as the ward comes out of the safety zone.

As described above, the location of the ward may be captured by the communication terminal carried by the ward at predetermined times and the captured images may be forwarded to the guardian, so that the location of the ward may be more precisely known. And, since the location identification networks may be automatically changed as the ward shifts his location, more precise location identification is possible through the near-field communication network.

Further, when the ward is not located in the safety zone at the predetermined times, an alarm message may be immediately transferred to the guardian so that a dangerous situation encountered by the ward may be more easily known.

The method of providing a content using a wireless communication device according to an embodiment of the present invention includes a computer readable medium including a program command for performing operations implemented by a computer. The computer readable medium may include a program command, a data file, and a data structure alone or in a combination thereof. The medium or the program command may be one specially designed or constructed for the present invention or one known to one of ordinary skill in the computer software art. Examples of the computer readable recording medium may include magnetic media, such as hard disks, floppy disks, or magnetic tapes, magneto-optical media, such as CD-ROMs or DVDs, and hardware devices, such as ROMs, RAMs, or flash memories, which are specially constructed for storing and executing the program command. Examples of the program command may include machine language codes made by compiler or high class language codes executable by computer using an interpreter.

The foregoing embodiments and advantages are merely exemplary and are not to be construed as limiting the present invention. The present teaching can be readily applied to other types of apparatuses. The description of the foregoing embodiment is intended to be illustrative, and not to limit the scope of the claims. Many alternatives, modifications, and variations will be apparent to those skilled in the art.

The invention claimed is:

1. A safety photo service providing method, said method comprising: setting a time for identifying a location of a ward, attempting to perform near-field location measurement at a platform of a near-field communication network associated with a predetermined area, determining that near-field location measurement is impossible, changing said location identification network to a cellular network, measuring a location through a location service provided on said cellular network, performing location identification and image capturing by a ward's terminal at the set time, and transmitting location identification information, the information including at least one of a location of the ward and a captured image, to the guardian's terminal.

2. The method of claim 1, wherein setting the time is performed so that a location is identified at a constant period or at one or more specified times.

3. The method of claim 1, wherein the predetermined area is set as one or more places corresponding to a ward's activity area or a near field communication network installation area.

4. The method of claim 1, wherein changing the location identification network to a cellular network comprises changing said network to a CDMA network.

5. The method of claim 1, wherein performing the location identification and image capturing includes automatically identifying a ward's location at the set time and capturing an image of surroundings of the ward using a camera attached to the terminal.

6. The method of claim 1, wherein transmitting the location identification information includes
transmitting location identification information to the guardian's terminal, the information including at least one of a captured image and whether the ward is located in a safety zone in a case in which the ward is located in the safety zone, and
transmitting location identification information to the guardian's terminal, the information including at least one of an expected location of the ward, a current location of the ward, and a captured image in a case in which the ward is located outside of the safety zone.

7. The method of claim 6, further comprising, if the expected location of the ward is different from the current location of the ward in a case in which the ward is located outside of the safety zone, transmitting an alarm message to the guardian's terminal.

8. The method of claim 1, wherein the location identification information further includes at least one of: a distance from the ward, a path reaching the ward, and a travelling radius of the ward.

9. The method of claim 1, wherein transmitting includes transmitting the location identification information to the guardian's terminal through SMS, wherein the SMS includes a callback connection menu.

10. A recording medium readable by a computer, wherein the medium stores a program for setting a time for identifying a location of a ward attempting to perform near field location measurement at a platform of a near-field communication network associated with a predetermined area, determining that near-field location measurement is impossible, changing said location identification network to a cell phone network, measuring a location through a location service provided on said cell phone network, performing location identification and image capturing by a ward's terminal at the set time, and transmitting location identification information, the information including at least one of a location of the ward and a captured image, to the guardian's terminal.

11. A safety photo service providing system, said system comprising: an identification time setup unit for setting a time for identifying a location of a ward; an identification network changing control unit for changing a location identification networks for the ward from a near-field communication network associated with a predetermined area to a cellular network when near-field location measurement is impossible using said near-field communication network; a location identification unit for performing location identification and image capturing by a ward's terminal at the set time; and an identification information transmitting unit transmitting location identification information, the information including at least one of a location of the ward and a captured image, to the guardian's terminal.

12. The system of claim 11, wherein the identification time setup unit sets the time so that a location is identified at a constant period or at one or more specified times.

13. The system of claim 11, wherein the predetermined area is set as one or more places corresponding to a ward's activity area and a near field communication network installation area.

14. The system of claim 11, wherein the cellular network is a CDMA network.

15. The system of claim 14, wherein the identification network changing control unit attempts to perform near field location measurement at a platform of a near field communication network, and measures a location through an LBSP of a CDMA network or a WCDMA network in a case in which the near field location measurement is impossible.

16. The system of claim 11, wherein the location identification unit automatically identifies a ward's location at the set time and performs image capturing of surroundings of the ward using a camera attached to the terminal.

17. The system of claim 11, wherein the identification information transmitting unit transmits location information identification to the guardian's terminal, the information including at least one of a captured image and whether the ward is located in a safety zone in a case in which the ward is located in the safety zone, and transmits location identification information to the guardian's terminal including at least one of an expected location of the ward, a current location of the ward, and a captured image in a case in which the ward is located outside of the safety zone.

18. The system of claim 17, wherein the identification information transmitting unit further transmits an alarm message to the guardians terminal if the expected location of the ward is different from the current location of the ward in a case in which the ward is located outside of the safety zone.

19. The system of claim 11, wherein the location identification information further includes at least one of: a distance from the ward, a path reaching the ward, and a travelling radius of the ward.

20. The system of claim 11, wherein the identification information transmitting unit transmits the location identification information to the guardian's terminal through SMS, wherein the SMS includes a callback connection menu.

21. The method of claim 1, wherein changing the location identification network to a cellular network comprises changing said network to a WCDMA network.

22. The system of claim 11, wherein the cellular network is a WCDMA network.

* * * * *